(12) United States Patent
Adey et al.

(10) Patent No.: US 10,866,170 B2
(45) Date of Patent: Dec. 15, 2020

(54) DEVICES, SYSTEMS, AND METHODS FOR EXTRACTING A MATERIAL FROM A MATERIAL SAMPLE

(75) Inventors: Nils B. Adey, Salt Lake City, UT (US); Katherine B. Geiersbach, Salt Lake City, UT (US); Mark Herrmann, Bountiful, UT (US); Robert J. Parry, Park City, UT (US)

(73) Assignee: Roche Molecular Systems, Inc, Pleasanton, CA (US)

( * ) Notice: Subject to any disclaimer, the term of this patent is extended or adjusted under 35 U.S.C. 154(b) by 641 days.

(21) Appl. No.: 13/981,541

(22) PCT Filed: Nov. 16, 2011

(86) PCT No.: PCT/US2011/061075
§ 371 (c)(1),
(2), (4) Date: Jul. 24, 2014

(87) PCT Pub. No.: WO2012/102779
PCT Pub. Date: Aug. 2, 2012

(65) Prior Publication Data
US 2014/0329269 A1    Nov. 6, 2014

Related U.S. Application Data

(60) Provisional application No. 61/461,925, filed on Jan. 24, 2011, provisional application No. 61/491,829, filed on May 31, 2011.

(51) Int. Cl.
*G01N 1/31* (2006.01)
*G01N 1/04* (2006.01)
(Continued)

(52) U.S. Cl.
CPC .............. *G01N 1/31* (2013.01); *G01N 1/04* (2013.01); *G01N 2001/2873* (2013.01); *G01N 2001/383* (2013.01)

(58) Field of Classification Search
CPC .............................. A61B 17/32; B01L 1/00
See application file for complete search history.

(56) References Cited

U.S. PATENT DOCUMENTS

| 281,695 A | 7/1883 | Holcombe |
| 3,238,889 A | 3/1966 | Huber et al. |

(Continued)

FOREIGN PATENT DOCUMENTS

| AU | 2002233157 | 7/2002 |
| CN | 101018502 A | 8/2007 |

(Continued)

OTHER PUBLICATIONS

Office Action for Chinese application 201180069499.6 dated Oct. 20, 2014, 20 pages including English Translation.

(Continued)

*Primary Examiner* — Matthew D Krcha
(74) *Attorney, Agent, or Firm* — Thorpe North & Western, LLP; David W. Osborne

(57) ABSTRACT

Devices, systems, and associated methods for selectively extracting a material from a sample are provided. In one aspect, for example, a method for selectively extracting biological material from a biological sample can include identifying a region of biological material to be extracted from a biological sample disposed on a substantially planar surface, applying an extraction tool to the region of biological material to disrupt biological material from the biological sample, and dispensing a liquid at the region of biologi- (Continued)

cal material. The method can also include aspirating the liquid and the disrupted biological material from the biological sample.

14 Claims, 7 Drawing Sheets

(51) Int. Cl.
*G01N 1/28* (2006.01)
*G01N 1/38* (2006.01)

(56) References Cited

U.S. PATENT DOCUMENTS

| | | | |
|---|---|---|---|
| 3,732,858 A * | 5/1973 | Banko | A61B 10/0266 600/566 |
| 3,906,954 A * | 9/1975 | Baehr | A61F 9/00763 604/27 |
| 4,320,761 A * | 3/1982 | Haddad | A61F 9/00763 408/58 |
| 4,679,446 A | 7/1987 | Sheehan et al. | |
| 5,218,645 A | 6/1993 | Bacus | |
| 5,267,955 A * | 12/1993 | Hanson | A61B 17/32075 600/565 |
| 5,428,690 A | 6/1995 | Bacus et al. | |
| 5,511,556 A | 4/1996 | DeSantis | |
| 5,817,955 A | 1/1998 | Gherson et al. | |
| 5,843,644 A | 12/1998 | Liotta et al. | |
| 5,843,657 A | 12/1998 | Liotta et al. | |
| 5,925,834 A | 7/1999 | Sgourakes | |
| 6,010,888 A | 1/2000 | Liotta et al. | |
| 6,161,442 A | 12/2000 | Sgourakes | |
| 6,204,030 B1 | 3/2001 | Liotta et al. | |
| 6,251,516 B1 | 6/2001 | Bonner et al. | |
| 6,342,143 B1 | 1/2002 | Minden | |
| 6,565,728 B1 | 5/2003 | Kozulic | |
| 6,602,071 B1 | 8/2003 | Ellion et al. | |
| 6,673,086 B1 | 1/2004 | Hofmeier | |
| 6,684,720 B2 | 2/2004 | Sgourakes | |
| 6,702,990 B1 | 3/2004 | Camacho et al. | |
| 7,093,508 B2 | 8/2006 | Harris | |
| 7,185,551 B2 | 3/2007 | Schwartz | |
| 7,473,401 B1 | 1/2009 | Baer | |
| 7,482,169 B2 | 1/2009 | Gjerde et al. | |
| 7,673,531 B2 | 3/2010 | May et al. | |
| 7,794,664 B2 | 9/2010 | Pelletier et al. | |
| 7,803,634 B2 | 9/2010 | Klimov et al. | |
| 7,883,666 B2 | 2/2011 | Ting | |
| 7,907,259 B2 | 3/2011 | Sagmuller | |
| 8,545,517 B2 | 10/2013 | Bodduluri | |
| 8,668,872 B2 | 3/2014 | Klimov et al. | |
| 9,028,757 B2 | 5/2015 | Klimov et al. | |
| 9,060,795 B2 * | 6/2015 | Meenink | A61B 19/2203 |
| 9,547,898 B2 | 1/2017 | Hall | |
| 2001/0031981 A1* | 10/2001 | Evans | A61B 17/221 606/200 |
| 2002/0091441 A1 | 7/2002 | Guzik | |
| 2002/0108857 A1 | 8/2002 | Paschetto et al. | |
| 2002/0134175 A1 | 9/2002 | Mehra et al. | |
| 2003/0179916 A1 | 9/2003 | Magnuson | |
| 2004/0053326 A1 | 3/2004 | Emmert-Buck | |
| 2004/0142488 A1 | 7/2004 | Gierde et al. | |
| 2005/0042692 A1 | 2/2005 | Star | |
| 2005/0175511 A1 | 8/2005 | Cote | |
| 2005/0250211 A1 | 11/2005 | Reinhardt et al. | |
| 2006/0074346 A1 | 4/2006 | Hibner | |
| 2006/0243110 A1 | 11/2006 | Osterman et al. | |
| 2007/0082389 A1* | 4/2007 | Clark | C12M 45/02 435/287.2 |
| 2007/0086917 A1 | 4/2007 | Lemme | |
| 2008/0019878 A1 | 1/2008 | Trump | |
| 2008/0148913 A1 | 6/2008 | Chen | |
| 2008/0161842 A1 | 7/2008 | Ting | |
| 2010/0000383 A1 | 1/2010 | Koos | |
| 2010/0145326 A1 | 6/2010 | Hoey et al. | |
| 2010/0224013 A1 | 9/2010 | Van Berkel et al. | |
| 2011/0104642 A1 | 5/2011 | Luksch | |
| 2012/0045790 A1 | 2/2012 | Van Dijk | |
| 2013/0344500 A1 | 12/2013 | Trautman | |
| 2014/0098214 A1 | 4/2014 | Schlaudraff | |
| 2014/0348410 A1 | 11/2014 | Grunkin | |
| 2014/0356876 A1 | 12/2014 | Ragan | |
| 2018/0025210 A1 | 1/2018 | Remiszewski | |

FOREIGN PATENT DOCUMENTS

| | | |
|---|---|---|
| CN | 201262598 | 6/2009 |
| CN | 101543413 A | 9/2009 |
| DE | 19818425 | 7/1999 |
| EP | 1067374 | 1/2001 |
| EP | 1969340 | 9/2008 |
| JP | S47-007506 | 3/1972 |
| JP | S61-045957 | 3/1986 |
| JP | S62-292144 | 12/1987 |
| JP | H07-184908 A | 7/1995 |
| JP | 2001-500772 | 1/2001 |
| JP | 2001041864 | 2/2001 |
| JP | 2004-069666 | 3/2004 |
| JP | 2004258017 A | 9/2004 |
| JP | 2006-506672 | 2/2006 |
| JP | 2006-518654 | 8/2006 |
| JP | 2007-209360 | 8/2007 |
| JP | 2007-286697 | 11/2007 |
| JP | 2009103701 | 5/2009 |
| JP | 2010-267092 | 11/2010 |
| JP | 05215969 | 4/2011 |
| JP | 2012198234 | 10/2012 |
| JP | 2013-178825 | 9/2013 |
| JP | 2013-195133 | 9/2013 |
| JP | 2013245988 | 12/2013 |
| KR | 100271053 | 11/2000 |
| KR | 20020085123 | 11/2002 |
| KR | 20050027607 | 3/2005 |
| KR | 20050027609 | 3/2005 |
| WO | WO 2000/057153 A1 | 9/2000 |
| WO | WO 0237159 | 5/2002 |
| WO | WO 02057746 | 7/2002 |
| WO | WO2004045768 | 6/2004 |
| WO | WO2006123967 | 11/2006 |
| WO | WO 2007/076934 | 7/2007 |
| WO | WO2008156566 | 12/2008 |
| WO | WO 2009/008843 A1 | 1/2009 |
| WO | WO 2010093861 A2 | 8/2010 |
| WO | WO 2010125495 | 11/2010 |
| WO | WO2014140070 | 11/2014 |

OTHER PUBLICATIONS

Office Action for Chinese application 201180069499.6 dated Jul. 10, 2015, 6 pages including English Translation.
Office Action for Chinese application 201180069499.6 dated Oct. 10, 2015, 4 pages including English Translation.
Beltinger et al.; A simple combined microdissection and aspiration device for the rapid procurement of single cells from clinical peripheral blood smears; Molecular Pathology; 1998; pp. 233-236; vol. 51.
De Bruin et al; Macrodissection versus microdissection of rectal carcinoma: minor influence of stroma cells to tumor cell gene expression profiles; BMC Genomics; Oct. 14, 2005; 10 pages; vol. 6, No. 142; BioMed Central.
Going; Histological microdissection in diagnostic and investigative pathology; Diagnostic Histopathology; Jan. 2010; pp. 43-48; vol. 16, Issue 1; Elsevier.
Going et al.; Practical histological microdissection for PCR analysis; The Journal of Pathology; May 1996; pp. 121-124; vol. 179, Issue 1; John Wiley & Sons, Ltd.
Hernandez et al.; Manual versus laser micro-dissection in molecular biology; Ultrastructural Pathology; 2006; pp. 221-228; vol. 30, No. 3; Informa Healthcare.

(56) References Cited

OTHER PUBLICATIONS

Lee et al.; A simple, precise and economical microdissection technique for analysis of genomic DNA from archival tissue sections; Oct. 1998; pp. 305-309; vol. 433, Issue 4; Springer-Verlag.
Linton et al.; Preparation of formalin-fixed paraffin-embedded (FFPE) tissue for RNA extraction; BioTechniques; Nov. 2009; p. 54.
Martin et al.; Differences in the Tumor Microenvironment between African-American and European-American Breast Cancer Patients; PLoS One; Feb. 2009; 14 pages; vol. 4, Issue 2; www.plosone.org.
Quistorff et al.; Simple Techniques for Freeze Clamping and for Cutting and Milling of Frozen Tissue at Low Temperature for the Purpose of Two- or Three-Dimensional Metabolic Studies in Vivo; Analytical Biochemistry; 1980; pp. 237-248; vol. 108; Academic Press, Inc.
Walker, et al.: Quantatative PCR for DNA identification based on genome-specific interspersed repetitive elements; Genomics; 2004; pp. 518-527; vol. 83; Elsevier.
http://www.rolynoptics.thomasnet.com/item/d-microscope-sections-microscope-stages-and-mounts//mechanical-stage/80/5166-id-1769-.
http://www.griffinmotion.com/product-detail.asp?productid=20.
http://www.dino-lite.com.
http://en.nanotec.com/hollowshaft_steppermotors.html.
http://www.dell.com/us/p/inspiron-mini1018/pd?refid+inspiron-1018&s=dhs&cs=19.
http://www.ncbi.nlm.nih.gov/pubmed/_12711348.
http://www.etaluma.com/Index.php.
http://www.micromark.com/MicroLux-Micro-Milling-Machine.9683.html.
PCT Application PCT/US2011/061075; Filing date Nov. 16, 2011; Adey Nils B et al.; International Search Report dated Jul. 18, 2012.
Extended European search report dated Aug. 29, 2017, in EP Application No. EP 11 85 7029, filed Nov. 16, 2011, 11 pages.

* cited by examiner

DEVICES, SYSTEMS, AND METHODS FOR EXTRACTING A MATERIAL FROM A MATERIAL SAMPLE

PRIORITY DATA

This application claims the benefit of U.S. Provisional Patent Application Ser. Nos. 61/461,925, filed on Jan. 24, 2011, and 61/491,829, filed on May 31, 2011, each of which is incorporated herein by reference in its entirety.

BACKGROUND OF THE INVENTION

Two commonly used techniques for dissecting specific areas from slide mounted tissue sections are Manual Macrodissection and Laser Capture Microdissection (LCM). Manual Macrodissection is predominately used in the pathology field because it has negligible cost, is relatively quick, and generally large quantities of sample are obtained. However, the lower limit of precision is about 1 mm, which can limit accuracy, and the manual nature makes it error prone and poorly documented. LCM is spatially precise allowing capture resolution as small as 5 µm and thus the ability to target single cells. However, equipment is very expensive, it is slow and requires full time interaction by a trained operator, and the spatial precision comes at the price of minute quantities of recovered sample, making downstream biochemical analysis challenging and often requiring extensive amplification that can bias results. A third dissection technique using needles and micromanipulators has not gained wide spread acceptance because it is difficult and labor intensive.

SUMMARY OF THE INVENTION

The present disclosure provides devices, systems, and associated methods for selectively extracting a material from a sample. In one aspect, for example, a method for selectively extracting a material, such as a biological material, from a sample, such as a biological sample can include identifying a region of material to be extracted from a sample, applying an extraction tool to the region of material to disrupt material from the sample, and dispensing a liquid at the region of material. The method can also include aspirating the liquid and the disrupted material from the sample.

The extraction tool can utilize a variety of motions to disrupt the material from the sample, and any such motion capable of disrupting material is considered to be within the present scope. In one aspect, for example, the extraction tool can impart a cutting motion to the region of material. Any cutting motion is contemplated, non-limiting examples including rotating, vibrating, slicing, and the like, including combinations thereof. In one specific aspect, the cutting motion is rotating.

Various methods of dispensing the liquid and aspirating the liquid and the disrupted material are contemplated. In one aspect, for example, the liquid can be dispensed at an interface between the region of material and the extraction tool. In this manner disrupted material is readily mixed with the liquid as it is disrupted. In another aspect, the liquid is dispensed and aspirated simultaneously. Thus the disrupted material can be quickly removed by the aspirated liquid from the sample. In yet another aspect, the liquid is dispensed and aspirated by the extraction tool, or in other words, the liquid is dispensed and aspirated from ports coupled to, or otherwise associated with, or formed integrally with, the extraction tool.

Additionally, a variety of techniques for identifying a region of material, such as biological material are contemplated. In one aspect, for example, identifying a region of material further includes obtaining a real time digital image of the sample and defining an area of interest on the digital image corresponding to the region of material, where movement of the sample is reflected by movement of the area of interest and/or the digital image to maintain position of the area of interest relative to the material. In another aspect, the sample is a series of sections, and the area of interest is defined on one section that corresponds to the region of material from a different section.

The present disclosure additionally provides various material extraction devices. In one aspect, for example, an extraction device for selectively extracting material, such as a biological material from a sample, such as a biological sample, can include a housing and at least one cutting tip rotatably coupled to the housing and configured to be rotatably driven by a motor. The cutting tip is operable to disrupt material from a region of a sample. The device can further include at least one liquid dispensing port coupled to the housing and located proximal to the cutting tip, where the liquid dispensing port is operable to dispense liquid at the cutting tip. Additionally, at least one liquid aspiration port is coupled to the housing and located proximal to the cutting tip, where the liquid aspiration port is operable to aspirate liquid and disrupted biological material from a region proximal to the cutting tip. In another aspect, the at least one liquid dispensing port and the at least one liquid aspiration port rotate with the cutting tip. In yet another aspect, the at least one liquid dispensing port and the at least one liquid aspiration port are operable to function simultaneously.

The cutting tip can be of any size, depending on the desired cutting task. In one aspect, for example, the cutting tip is sized to disrupt an area of biological material of from about 10 µm in size to about 1 mm in size. In another aspect, the cutting tip is sized to disrupt an area of material of from about 100 µm in size to about 250 µm in size.

The present disclosure additionally provides systems for selectively extracting a material from a sample. In one aspect, for example, a system for selectively extracting material, such as biological material from a sample, such as a biological sample can include an extraction device as has been described herein positioned to operationally face a support substrate and to engage a sample disposed on the support substrate. A motor can be operationally coupled to the extraction device and operable to rotate the cutting tip. A fluidics system can be coupled to the extraction device and operable to deliver fluid to the liquid dispensing port and withdraw fluid from the liquid removal port. Furthermore, a positional movement system can be coupled to the extraction device and operable to move either the cutting tip of the extraction device relative to the support substrate or the support substrate relative to the cutting tip.

It can be beneficial to visualize the material extraction process during use. As such, in one aspect a visualization system is included and is positioned to provide a visual display of a sample, such as a biological sample, placed on the support substrate. The visualization system can include a variety of visualization devices, including without limitation, digital imagers, optical imagers, microscopes, inverted microscopes, and the like, including combinations thereof. In one specific aspect, the support substrate is transparent. In another aspect, the visualization system is an inverted microscope positioned to provide the visual display from a side of the transparent support substrate opposite the cutting tip. In yet another aspect, the visualization system is operable to provide a real time visual display of the cutting tip during an extraction procedure.

In another aspect, the system for selectively extracting material, such as a biological material from a sample, such as a biological sample, can further include a manual manipulation system. This manual system is functionally coupled to the positional movement system and is operable to allow a user to move the cutting tip and/or the support substrate relative to one another.

In yet another aspect, the system for selectively extracting material, such as a biological material from a sample, such as a biological sample, can further include an automatic manipulation system. Such an automatic system is functionally coupled to the positional movement system and is operable to automatically move the cutting tip and/or the support substrate relative to one another. In another aspect, the automatic system further includes a processing system functionally coupled to the automatic manipulation system. The processing system is operable to identify and locate a predetermined region of material to be extracted from a sample and move the cutting tip and/or support substrate relative to one another to extract the biological material via the automatic manipulation system.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

Figure 1:
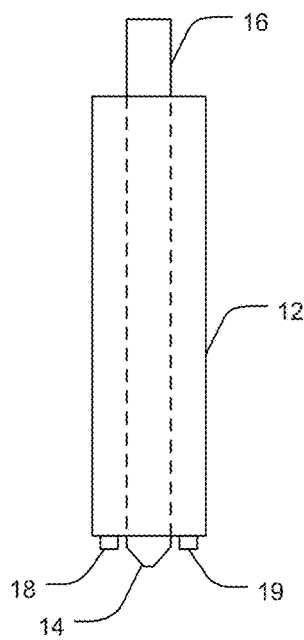
FIG. 1 shows a side view of a material extraction device in accordance with one embodiment of the present invention.

The drawings will be described further in connection with the following detailed description. Further, these drawings are not necessarily to scale and are by way of illustration only such that dimensions and geometries can vary from those illustrated.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It must be noted that, as used in this specification and the appended claims, the singular forms "a," "an," and "the" include plural referents unless the context clearly dictates otherwise. Thus, for example, reference to "the cutting tip" includes one or more of such tips, reference to "a liquid port" includes reference to one or more of such ports.

Definitions

In describing and claiming the present invention, the following terminology will be used in accordance with the definitions set forth below.

As used herein, the term "substantially" refers to the complete or nearly complete extent or degree of an action, characteristic, property, state, structure, item, or result. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect on the property of interest thereof.

As used herein, the term "about" is used to provide flexibility to a numerical range endpoint by providing that a given value may be "a little above" or "a little below" the endpoint with a degree of flexibility as would be generally recognized by those skilled in the art. Further, the term about explicitly includes the exact endpoint, unless specifically stated otherwise.

As used herein, a plurality of items, structural elements, compositional elements, and/or materials may be presented in a common list for convenience.

However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation should apply regardless of the breadth of the range or the characteristics being described.

The Invention

The present disclosure relates to devices, systems, and methods for removing material from a material sample. In some cases, the material that has been extracted is saved for further processing or analysis. Such may be the case for procedures involved in forensics, testing of material purity, histopathology, core sampling, and the like. In some cases, serial sections of a material sample can be generated that allows a destructive sampling of one section while retaining structural features from adjacent sections for further analysis.

One example of where such testing can be beneficial is in the area of histopathology or other biological fields whereby biological material is removed from a biological sample. It should be noted, however, that although much of the following description is biological in nature, the present scope is not limited to such. Rather, the present disclosure applies to any material and/or testing procedure relating to the current aspects.

In one aspect a method for selectively extracting biological material from a biological sample is provided. In such a method, a region of biological material to be extracted from a biological sample is identified. In some cases, the biological sample is disposed on a surface, such as for example, a substantially planar or planar surface. In other cases, the biological sample can be in the form of a block or other three dimensional object. The biological material can be any type of biological material, and can be derived from a variety of biological organisms, including animals, humans, plants, fungus, and the like. The biological sample itself can include any material derived from a biological organism, including tissue, tissue sections, organs, organ sections, cells, cultured cells, cultured tissue, plant matter, secretions, excretions, and the like, including combinations thereof. The biological material can also be embedded in a matrix such as plastic, paraffin, a gel, or any other material or agent useful to present the material in a solid, semisolid, or suspended form, and can include fresh or frozen biological sample or sample sections. Thus the region of biological material is an area from which biological material is to be extracted from the biological sample.

The method can further include applying an extraction tool to the region of biological material to disrupt biological material from the biological sample. In some aspects, the extraction tool contacts the biological sample in the identified region and disrupts biological material therefrom. Any configuration of extraction tool capable of disrupting the biological material is considered to be within the present scope. Additionally, a variety of disruptive motions are contemplated. In one aspect, for example, the disruptive motion is a cutting motion. Non-limiting examples of cutting motions include rotating, vibrating, slicing, and the like, including combinations thereof. In one specific aspect the cutting motion is rotation.

The method can also include dispensing a liquid at the region of biological material. The liquid can be dispensed on a portion of the biological sample, or it can be dispensed over the entire or substantially the entire sample. In one aspect, the liquid is dispensed at an interface between the region of biological material and the extraction tool. The liquid can be any liquid that is beneficial for extracting biological material from a biological sample. The liquid can include any liquid medium capable of mixing with the disrupted biological material. In some cases, the liquid can be designed to merely mix with the biological material. In other cases, the liquid can be formulated to react with the biological material and/or the biological sample. For example, the liquid can contain enzymes or other chemical moieties to facilitate the disruption and/or breakdown of the biological material. As such, further processing steps can be facilitated as the biological material is being extracted from the biological sample. Generally the liquid can contain one or more of various solvents, enzymes, buffers, and the like. In one aspect, the liquid can be water or purified water.

The method can also include removing the liquid and at least a portion of the disrupted biological material from the biological sample. Thus, once the disrupted biological material is mixed with the liquid, both the liquid and the biological material can be removed for further processing or disposal. In addition to any enzymatic reactions, the liquid thus creates a slurry or suspension of the biological material in order to facilitate removal from the sample. Removal can occur via a variety of mechanisms, including without limitation, aspiration, wicking, gravity flow, and the like. In one specific aspect, the removal is by aspiration. The removal of the liquid can occur sequentially with the dispensing of the liquid or the removal can occur simultaneously with the dispensing. In one specific aspect, the liquid is dispensed and aspirated simultaneously. Additionally, in some cases the dispensing and removal of the liquid occurs separately from the extraction tool. In one aspect, the liquid is dispensed and aspirated by the extraction tool.

While dispensing and removing liquid have been described with the disruption of the material, it should be noted that such disruption can occur in the absence of a liquid, and that any other physical method of removing the disrupted material is considered to be within the present scope. For example, the disrupted material can be removed from the surface using a vacuum and recovered on an air filter.

The present disclosure additionally provides tools for the extraction of material from a sample. In one aspect, as is shown in FIG. 1 for example, an extraction device for selectively extracting biological material from a biological sample is provided. Such a device can include a housing 12 for containing the various components of the device and at least one cutting tip 14. As has been described, the cutting tip 14 can disrupt biological material from the biological sample using a variety of cutting motions, such as for example, rotating, slicing, vibrating, punching, and the like. In one specific aspect, the cutting motion is rotational. In such cases, the cutting tip 14 is rotatably coupled to the housing 12 and configured to be coupled 16 to and rotatably driven by a motor (not shown). Thus as the cutting tip contacts the biological sample, the rotational motion disrupts biological material.

The extraction device can additionally include at least one liquid dispensing port 18 coupled to the housing 12 and located in a position that is proximal to the cutting tip 14. As such, the liquid dispensing port 18 dispenses liquid at the cutting tip 14, and in doing so may reduce the volume of liquid required to perform a cutting procedure. Furthermore, the extraction device can include at least one liquid aspiration port 19 coupled to the housing 12 and located in a position that is proximal to the cutting tip 14. As such, the liquid aspiration port 19 aspirates liquid and disrupted biological material from a region proximal to the cutting tip 14, thus minimizing the contact of liquid and biological material at other regions of the biological sample.

Figure 2A:
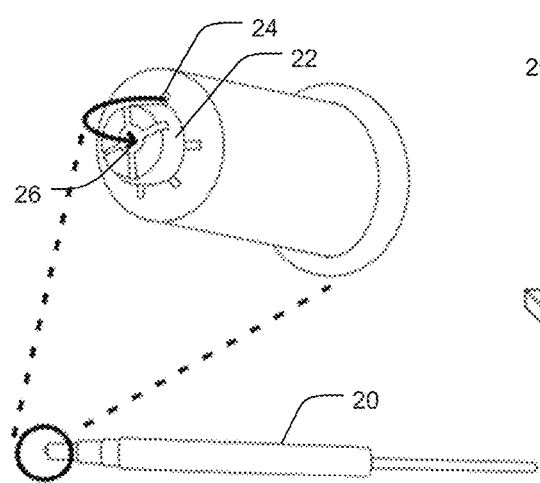
FIG. 2A shows a view of a material extraction device in accordance with another embodiment of the present invention.

In one aspect, the liquid dispensing port and the liquid aspiration port rotate with the cutting tip. One aspect of such a configuration is shown in FIGS. 2A & B. FIG. 2A shows one aspect having an extraction device 20 with a cutting tip 22, a liquid dispensing port 24, and a liquid aspiration port 26 associated with the cutting tip 22. It should be noted that both the liquid dispensing ports 24 and the liquid aspiration port 26 are associated with the cutting tip 22 in such a way that they rotate with the cutting tip. Liquid thus dispensed during a procedure will be located at an interface between the cutting tip and the biological sample. The arrow in FIG. 2A represents the path of the flow of liquid from the liquid dispensing port 24 to the liquid aspiration port 26 during use.

Figure 2B:
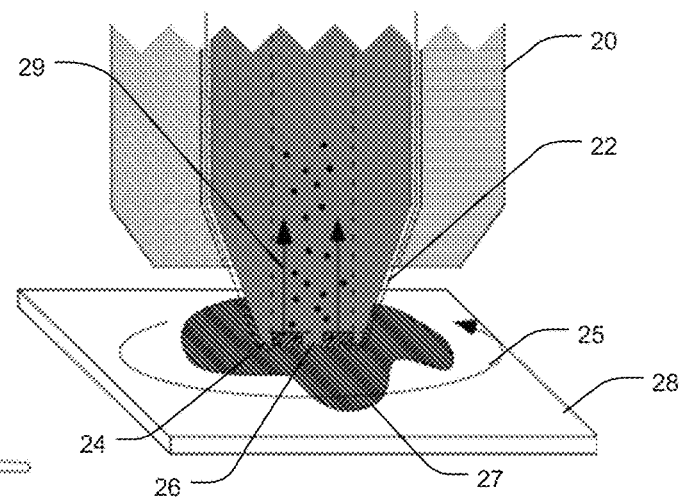
FIG. 2B shows a view of a material extraction device in use in accordance with another embodiment of the present invention.

FIG. 2B shows a cross section of the excision device of FIG. 2A while in use. In this case a biological sample 27 is disposed on a substantially planar surface 28 and a rotating cutting tip 22 is brought into contact with the biological sample. A liquid is dispensed from the liquid dispensing ports 24 associated with the cutting tip 22 to provide liquid at the interface between the cutting tip 22 and the biological sample 27. Biological material is disrupted from the biological sample and is mixed with the liquid at the interface. The liquid and biological material mixture is aspirated from the interface via the liquid aspiration port 26. Arrows 29 show the liquid and the biological material being aspirated through the liquid aspiration port 26 and through the extraction device.

Figure 3:
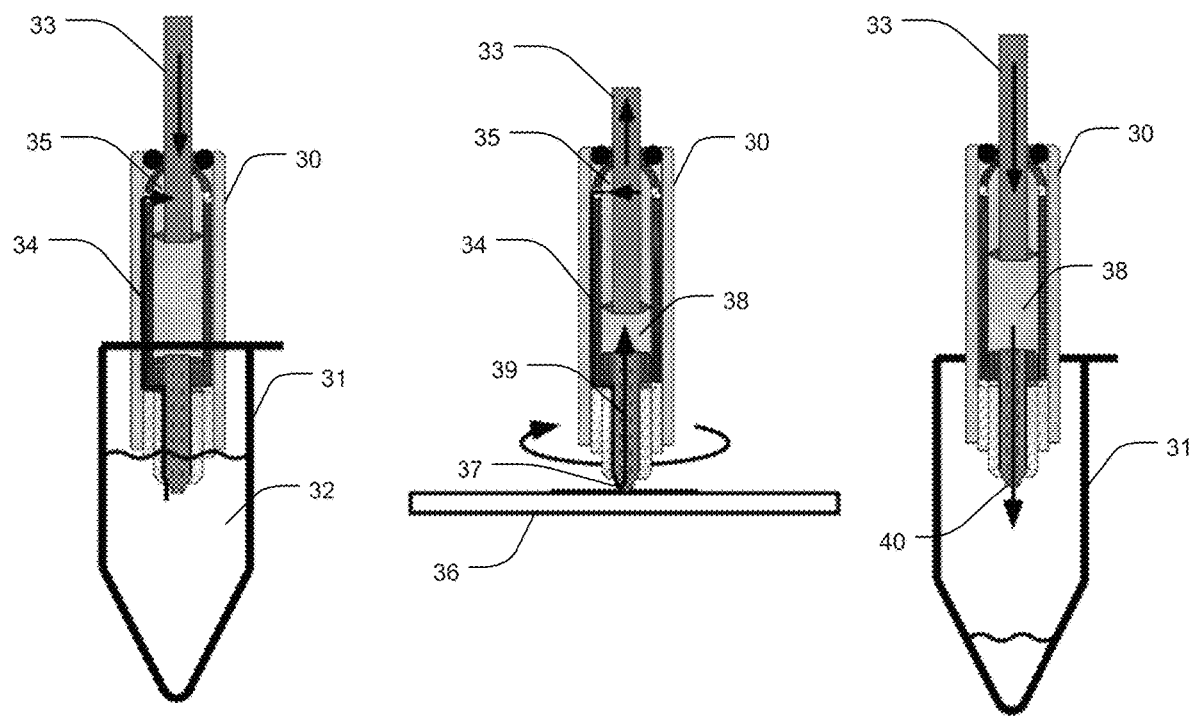
FIG. 3 shows a view of a material extraction device in use in accordance with another embodiment of the present invention.

In another aspect, the liquid dispensing port and the liquid aspiration port are operable to function simultaneously. It is noted that numerous designs can be utilized to achieve such functionality, and any such design is considered to be within the present scope. For example, in one aspect separate pumps can be utilized to simultaneously pump fluid out of the liquid dispensing port and aspirate liquid in through the liquid aspiration port. In other aspects, a single pump can be utilized having sufficient fluidics to allow simultaneous functionality. In one exemplary aspect shown in FIG. 3, the internal configuration of the extraction tool can allow such simultaneous functionality. In the left panel of FIG. 3, an extraction device 30 is positioned into a liquid holding vessel 31 to contact a liquid 32. A plunger 33 creating a seal within the extraction device 30 is depressed in a direction toward the liquid dispensing vessel 32. This depression causes the liquid 32 to move through a liquid dispensing port and an associated dispensing channel 34 to fill a liquid dispensing reservoir 35 within the extraction tool. The negative pressure created by the movement of the plunger 33 thus fills the liquid dispensing reservoir 35 with liquid. As is shown in the center panel of FIG. 3, the extraction tool 30 is then placed against a biological sample on a substantially planar surface and rotated to disrupt biological material. While the device is rotating, the plunger 33 can be withdrawn in a direction away from the substantially planar surface 36 in order to create positive pressure in the liquid dispensing reservoir 35. This positive pressure dispenses liquid through the dispensing channel 34 and out of the liquid dispensing port at the interface 37 between the biological sample and the excision device. Simultaneously the withdrawal of the plunger 33 causes a negative pressure within a liquid aspiration reservoir 38 that causes liquid at the interface 37 to be aspirated through the liquid aspiration port and associated aspiration channel 39 to thus fill the liquid aspiration reservoir with liquid and disrupted biological material. The right panel of FIG. 3 shows the plunger 33 being depressed toward the cutting tip 40, thus producing a positive pressure in the liquid aspiration reservoir 38 and expelling the liquid and biological material into a liquid holding vessel 31. The liquid holding vessel can be the same or different from the liquid holding vessel from which the extraction device was filled.

The various components of the excision device can be made from a variety of materials such as metals, polymers, rubbers, and the like. In general, the seals can be made from a compliant material such as soft plastic or rubber, the syringe tubes and cutting tip can be made of rigid materials such as, for example, hard plastic or metal, and the plunger can be made from a moderately compliant material. It can be useful for materials that will be in contact with liquid to have some degree of non-reactivity toward the liquid being used.

Figure 4:
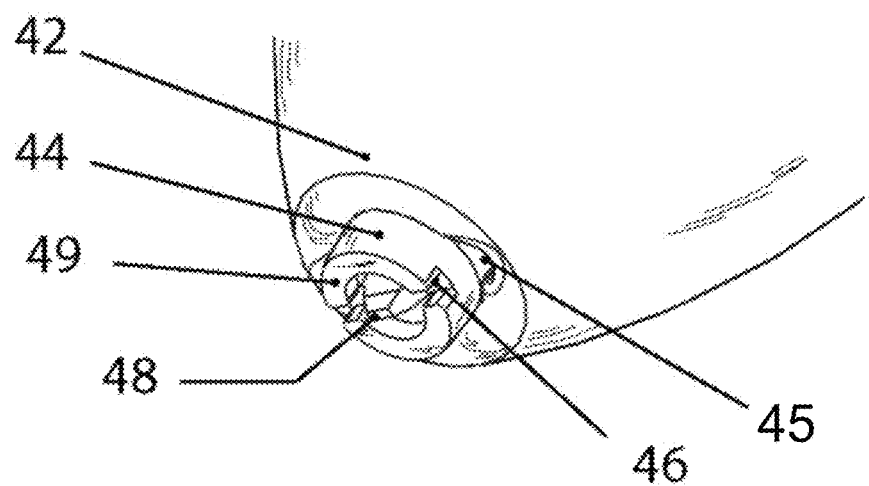
FIG. 4 shows a view of a cutting tip from a material extraction device in accordance with another embodiment of the present invention.

A variety of cutting tip designs are contemplated, and such designs can vary depending on the type and/or configuration of material being processed, as well as the overall design of the system being used. Non-limiting examples of types of cutting tips include blades, scrapers, planers, rough surfaces, hooks, serrations, and the like, including combinations thereof. For example, a roughed surface such as a grinding wheel can be used to disrupt material from the sample. In one aspect, a useful cutting bit design is shown in FIG. 4. FIG. 4 shows an extraction device housing 42 into which a rotatable cutting tip 44 is coupled. The cutting tip has at least one side-oriented opening 46 having an associated cutting bit 48. The cutting bit protrudes slightly from the underside surface 49 of the cutting tip 44. In this aspect, the broken circular cutting tip 44 functions effectively as a retaining "dam".

Liquid is dispensed out of a liquid dispensing port 45 positioned in the housing 42. The liquid enters the "dam" through the opening 46, as well as between the underside surface 49 and the support substrate such as a slide. The liquid is then aspirated through the center of the cutting tip in proximity to the cutting bit 48 (aspiration holes not shown). Thus, the material, such as biological material, is disrupted by the cutting bit 48 as the cutting tip 44 rotates, and the disrupted material is aspirated along with the liquid by the extraction tool. In another aspect, the cutting tip can lack an opening, and the liquid will primarily be drawn into the interior of the cutting tip 44 between the underside surface 49 and the support substrate. Such a design may minimize the loss of disrupted material on the support substrate surface.

The size of the cutting tip can also vary widely depending on the desired use of the device. As such, any size of cutting tip is considered to be within the present scope. In one aspect, however, the cutting tip is sized to disrupt an area of biological material of from about 10 µm in size to about 1 mm in size. In another aspect, the cutting tip is sized to disrupt an area of biological material of from about 100 µm in size to about 250 µm in size.

A variety of uses of material extraction devices and systems are contemplated, and any beneficial use is considered to be within the present scope. In one aspect, for example, the present disclosure includes systems, devices, and methods for dissecting specific areas of interest from slide mounted biological material, such as tissue sections, and recovering tissue fragments for downstream biochemical analysis. Specifically, an extraction device can be utilized as has been described herein to facilitate such dissections. In one aspect, a system including the extraction device can further include a platform to hold a substantially planar substrate such as a slide and move it in both X and Y axis directions. The system can further include a head piece positioned above the slide, which is capable of Z-axis movement to which the extraction device is coupled. Thus, the extraction device can displace very specific regions of biological material from the slide surface. In some aspects, a microscope can be positioned below the slide in an orientation to allow viewing of the cutting process. In other aspects, specialized software can be incorporated to designate an area of interest to be displaced.

In addition to the cutting tip discussions above, a specialized cutting bit can be similar to a mill bit in that rotational movement of the bit displaces material from a sample or from a surface. In those aspects whereby the cutting bit includes a liquid dispensing port and a liquid aspirating port, the cutting bit is capable of simultaneously dispensing and aspirating liquid directly on the cutting surface in order to recover displaced fragments of biological material in the aspirated liquid. In addition to the cutting tip designs described and contemplated above, the cutting bit can be a modified syringe where the seal of the syringe plunger divides the syringe body into two chambers, one on either side of the plunger seal. As the plunger is withdrawn, liquid from the plunger side chamber is displaced and routed through channels on the outside of the syringe body and dispensed on the slide in the immediate vicinity of the cutting tip, which is located on the opposite end of the syringe body from the plunger. The action of withdrawing the plunger also aspirates the dispensed liquid from the slide into the syringe chamber in the syringe body. While the syringe plunger is being withdrawn, the cutting bit is rotated as well as moved in X and Y directions on the slide surface, displacing tissue fragments. Thus, as the tissue is cut from the slide surface it is picked up by the flow of liquid and captured by the cutting bit. Following cutting, the plunger can be depressed to expel the cutting fluid into a tube and thus allow recovery of the cut and aspirated tissue fragments. (See for example, FIG. 3). Multiple sizes of cutting bits can allow either more precise or more rapid cutting. Of course such a syringe-type embodiment is merely exemplary, and should not be seen as limiting.

Figure 5:
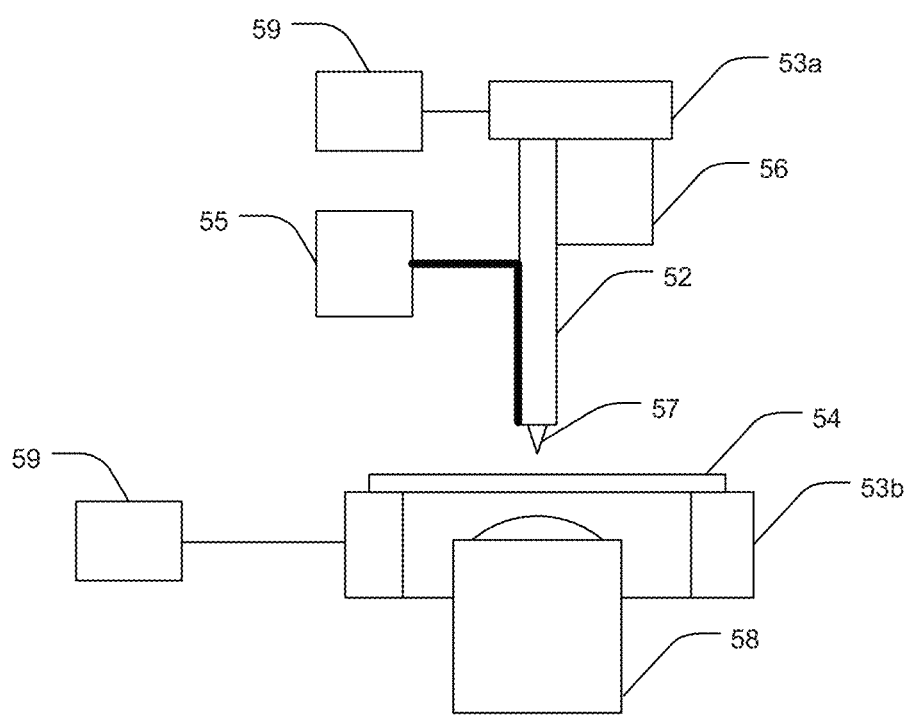
FIG. 5 shows a schematic view of a material extraction system in accordance with another embodiment of the present invention.

The present disclosure additionally provides systems for extracting material from a material sample. In one aspect, for example as is shown in FIG. 5, a system for selectively extracting biological material from a biological sample can include an extraction device 52 positioned to operationally face a support substrate 54 and to engage a biological sample disposed on the support substrate 54. The support substrate 54 can be any substrate capable of supporting the biological sample and functioning as outlined herein. Non-limiting examples can include microscope slides, clamps, Petri dishes, solid support surfaces, and the like. In some aspects the support substrate can be at least substantially planar. In other aspects, the support substrate can be transparent or translucent. Such a transparent substrate allows viewing of the cutting procedure from beneath the substrate.

The system can also include a motor 56 operationally coupled to the extraction device 52. The motor can be configured to rotate a cutting tip 57. Any motor capable of such rotation is contemplated, and any such is considered to be within the present scope. Such motors can include single speed, variable speed, reversible, and the like, including combinations thereof. Furthermore, the motor 56 can be operationally coupled to the extraction device 52 via any functional type of connection, including belts, direct drive, gears, and the like.

The system can also include a fluidics system 55 coupled to the extraction device 52 that is operable to deliver fluid to the liquid dispensing port and withdraw fluid from the liquid removal port (not shown). In some cases, the fluidics system 55 can be incorporated into the extraction device 52 as is, for example, described herein. In other aspects, the fluidics system 55 can be separate from the extraction device and be fluidically coupled thereto.

In another aspect, the system can include a positional movement system 53 coupled to the extraction device 52 and operable to move either the cutting tip 57 of the extraction device 52 relative to the support substrate 54 or the support substrate 54 relative to the cutting tip 57. 53a shows a positional movement system coupled to the extraction device 52, and 53b shows a positional movement system coupled to the support substrate 54. A given system can have either or both of these positional movements systems. Thus the positional movement system can move the extraction device, the support substrate, or both the extraction device and the support substrate relative to one another. The positional movement system can be under manual control or automatic control. In one aspect, for example, the positional movement system can be under manual control. In such cases the user can have control of the axial movement (e.g. the X and Y axis) of the support substrate, as well as vertical movement to control contact of 57 to 54 (Z-axis). In other aspects, the user can similarly control the axial and vertical movement of the extraction device. In one aspect, such control can be achieved via a joy stick or other manual manipulation instrument. Thus the user can extract regions of biological material from a slide surface using the real time image from a microscope to guide the process. FIG. 5 shows an inverted microscope 58 or other imaging device positioned to observe the extraction procedure from beneath the support substrate 54.

In other aspects, the user can also have control over Z-axis positioning of the cutting bit such that the bit can be lowered onto a specific region of the biological sample utilizing a positional movement system such as shown at 53a. Following cutting of a region, the cutting bit can be raised and moved to a second region, then a third region, etc. Bit pressure on the support substrate can be controlled by a variety of mechanisms. In one aspect, such control can be imparted by the weight of the instrument head, which rides on and thus is regulated by tension such as, for example, spring tension.

As has been described, the rotation of the cutting bit can be controlled by a motor coupled to the cutting bit. For those aspects whereby a plunger is utilized to control the fluid flow within the extraction device, withdraw and depression of the plunger can be controlled by a Z-axis actuator. In one aspect, the rate of plunger withdraw is timed to the rate of X and Y axis movement; the faster the rate of travel in the X and Y axis, the faster the rate of plunger withdraw. It is also possible to cut and recover tissue without X and Y movement simply by lowering the bit on a region. In this case, the plunger will be withdrawn slightly as the bit makes contact with the slide, but further plunger withdraw can be dependent on X and Y movement.

In another aspect, the positional movement system can be moved automatically. For example, an automatic manipulation system 55 can be functionally coupled to the positional movement system 53a, b. Such an automatic manipulation system can automatically move the extraction device and/or the support substrate relative to one another. While any form of automatic control is considered to be within the present scope, in one aspect the automatic manipulation system can be a computer control source or other processing system. For example, in one aspect a processing system can be functionally coupled to the automatic manipulation system. The processing system can thus be operable to identify and locate a predetermined region of biological material to be extracted from a biological sample and to move the cutting tip and/or support substrate relative to one another to extract the biological material via the automatic manipulation system. It is also contemplated that a highly automated multiple slide capacity version of the system in which movement in all three axis will be computer controlled can be implemented, as will the loading of the cutting fluid liquid and the recovery of fragments from the cutting bit.

It may also be beneficial for the system to include a visualization system to allow an extraction process to be viewed both in manual and automatic modes. In one aspect, for example, a visualization system 58 can be positioned to provide a visual display of a biological sample placed on the support substrate. Any visualization system known is considered to be within the present scope, non-limiting examples of which include digital imagers, optical imagers, microscopes, inverted microscopes, and the like, including combinations thereof. In one aspect, for example, the visualization system is an inverted microscope positioned to provide the visual display from a side of the support substrate opposite the cutting tip. In other words, the inverted microscope allows the viewing of the cutting procedure from beneath a transparent support substrate. In another aspect, the visualization system is operable to provide a real time visual display of the cutting tip during an extraction procedure.

The visual system also allows the ability to indicate digitally a region or area of interest to be processed or excised on the live image of a biological sample. This area of interest can then be optionally locked in position relative to the biological sample section and moved with the live image as the slide is moved under the cutting bit. In addition, the area of interest can be generated for a different biological sample section from a series of sections cut from the same sample (e.g. a tissue block). Because the sections are cut very thin, neighboring tissue sections have a very similar in overall morphology, although they may not be identical. The advantage of generating the area of interest from a neighboring section is that one section can be stained with a first type of stain and cover slipped for optimal viewing, while the neighboring section is stained with a second type of stain but not cover slipped for optimal recovery and downstream biochemical testing.

In one aspect, the system can be used to dissect and recover specific areas of tissue from slide mounted tissue sections for further biochemical analysis. However, in other aspects additional uses for the system are contemplated. In some cases, it can be desirable to remove specific regions of tissue sections so these regions do not interfere with analysis of tissue sections that remain on the slide. For example, in the case of FISH (Fluorescent In Situ Hybridization) analysis on heterogeneous tissue containing both tumor and non tumor regions, it can be beneficial to first remove some or all of the non tumor tissue from the slide surface in order to improve processing and analysis of the remaining tumor tissue. In another aspect, the system can be used to dissect thin layers of biological material other than tissue sections inmmobilized on standard laboratory slides. For example, layers derived from biological material either randomly spread or cultured on the slide surface can be processed. Alternatively, the biological material can be immobilized on a transparent surface other than a slide, for example a tissue culture dish. It is also possible that the layers are non-biological material, for example thin geological or semiconductor layers. It is to be understood that the instrument and the accompanying software described here, either in combination or separately, could potentially be used in a wide variety of applications and such uses are within the present scope.

Aspects of the present disclosure can be utilized in various microdissection procedures. In one aspect, for example, such microdissection procedures can be carried out on sequentially sliced sections of tissue. Tissue sections on slides are typically very thin (for example 3 microns) and are cut sequentially from the same block of tissue. In some cases, the block of tissue is chemically fixed, dehydrated, and embedded in paraffin wax. Sequentially cut tissue sections are termed neighboring tissue sections, and they are very similar, but not identical in overall morphology.

One specific example can include microscopic examination of formalin fixed, paraffin embedded (FFPE) tissue sections mounted on glass slides. This method relies upon a pathologist's subjective interpretation of histologic features seen at 20×-1000× magnification under brightfield microscopy. Ancillary testing is often required to fully classify human pathologic entities such as cancer, and FFPE tissue is usually used for these studies for two main reasons: 1) fresh tissue is not often available, and 2) histologic examination allows for selection of an appropriate area of the tissue for ancillary testing. Direct analysis of DNA or RNA recovered from paraffin embedded tumor specimens is currently employed for diagnosis, risk stratification, and treatment planning for a number of solid tumors.

Tumors are generally heterogeneous in composition, requiring dissection of neoplastic tissue from the surrounding non-neoplastic tissue in order to obtain a sufficiently high percentage of tumor cells for optimal analytic sensitivity of downstream testing. As has been described, dissection can be accomplished using a laser cutting tool or a variety of mechanical cutting tools under direct microscopic visualization (collectively termed "microdissection"), or by gross visualization of an area previously identified and marked under a microscope ("macrodissection"). Laser directed methods, collectively termed laser capture microdissection (LCM), include laser cutting and either thermoplastic film or "catapulting" to capture areas of tissue selected by real-time microscopic visualization. LCM is spatially very precise allowing capture of areas down to a few microns in size, but the technique has several drawbacks: the equipment is very expensive, and the procedure is very time consuming because it requires real-time histologic interpretation by the pathologist. The latter drawback may in fact be the main reason why LCM has not been adopted by most laboratories.

Mechanical microdissection is done under a microscope using needles, sonic chisels, or other scraping tools. The precision can approach that of LCM, but the equipment can be fairly expensive and like LCM the technique requires significant operator time and expertise particularly if the area has not been pre-selected by a pathologist. Macrodissection is done with the unaided eye using devices such as scalpels; the process is relatively easy and equipment expenses are often negligible, but precision is typically a few millimeters or more. Macrodissection is currently a popular method in many laboratories with a high test volume, because the procedure can be performed by a laboratory technologist without any training in histopathology. The pathologist simply circles the area to be tested on a slide and the laboratory technologist performs the actual macrodissection as well as downstream testing on a companion slide from the same FFPE tissue block.

The present devices and techniques overcome many of these problems and provide a system whereby such processes can be automated. The present device is relatively inexpensive to produce and operate, and can semi-automate or fully automate slide based tissue macrodissection and provide spatial resolution (smallest region recoverable) of 1 mm or less and positional accuracy of 0.1 mm or less (closer to microdissection than to manual macrodissection).

As such, the various devices and systems described herein can be incorporated with a software system that allows a user to indicate an area of interest on a digital image of a tissue section immobilized on a particular slide of a series of slides. The software system then can transfer that area of interest to the analogous location of a digital image of a tissue section immobilized on an adjacent slide (directly adjacent or further along in the slide series), and generate area of interest location information to a system for disrupting and extracting the tissue from the slide.

In one aspect, for example, a slide based process and software system can function as follows: A user can specify an area of interest on a tissue section immobilized on a first slide, possibly by generating a digital annotation on a digital image of the tissue section. The area of interest can be digitally transferred to an analogous region of a neighboring tissue section on another slide, or in some cases the area of interest can be transferred to a separate section on the same slide. The software specifies the X and Y coordinates of the area of interest relative to the slide and generates location information. The software can then direct the extraction device to disrupt and recover the tissue located at the area of interest on the second slide, while the morphology of the tissue is maintained on the first slide.

In a more specific aspect, two slides, each supporting a sequential tissue section from the same tissue sample are treated with different stains. One stain is used for visualization of the tissue section and the second stain is more compatible with tissue recovery and downstream biochemical analysis. For example, H&E stain could be used for visualization slide and Analine Blue stain could be used for tissue recovery slide. A high resolution digital image can be generated from the tissue visualization slide using a digital or other microscope. Using software drawing algorithms, a user such as a pathologist outlines an area of interest on the microscopic digital image from the tissue section visualization slide. The software also generates a digital image silhouette of the tissue section and positions the area of interest generated by the pathologist relative to the tissue section silhouette. For inventory purposes, digital images, in some cases lower resolution digital images, of the entire slide including the tissue sections and slide edges can be generated from both the visualization and tissue recovery slides, in one aspect by a standard digital camera. The software can generate digital image silhouettes of the tissue sections and position them relative to the edges of the slide. It is also possible to incorporate bar code reading software algorithms for database interactions.

The tissue section silhouettes from the low and high resolution visualization slide images are aligned by the operator or using image recognition algorithms and the location of the area of interest is transferred to the recovery tissue section image. The software then generates location information that is sent to the material extraction system, which allows it to recover tissue corresponding to the area of interest. A digital camera or barcode reader mounted on the extraction device checks bar codes on the slides and tubes to verify correct placement. After extraction is complete, the digital camera takes a picture of the tissue section to document the tissue region that was recovered.

Accordingly, such a software implementation can include a variety of software modules, such as command modules, image recognition modules, mechanical movement modules, barcode reading modules, graphical user interface modules, and the like. Generally such software and software modules would be resident in hardware within the extraction system or in an associated computer system or network.

Figure 6A:
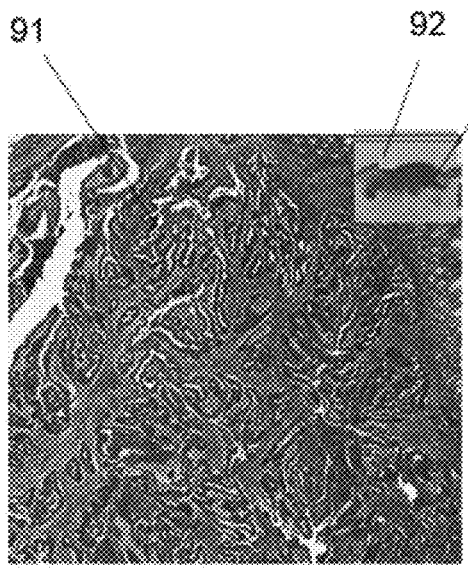
FIG. 6A-D show images of tissue being extracted by a material extraction device in accordance with another embodiment of the present invention.
Figure 6B:
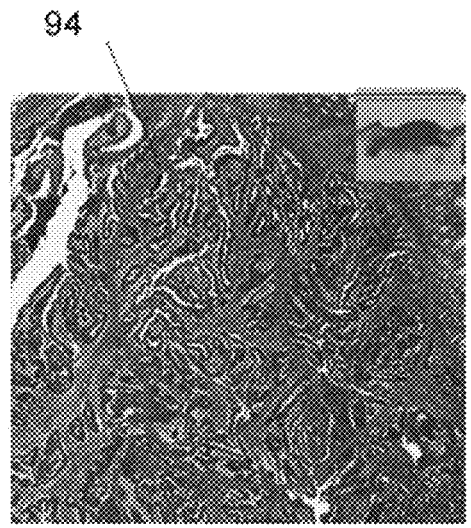
Figure 6C:
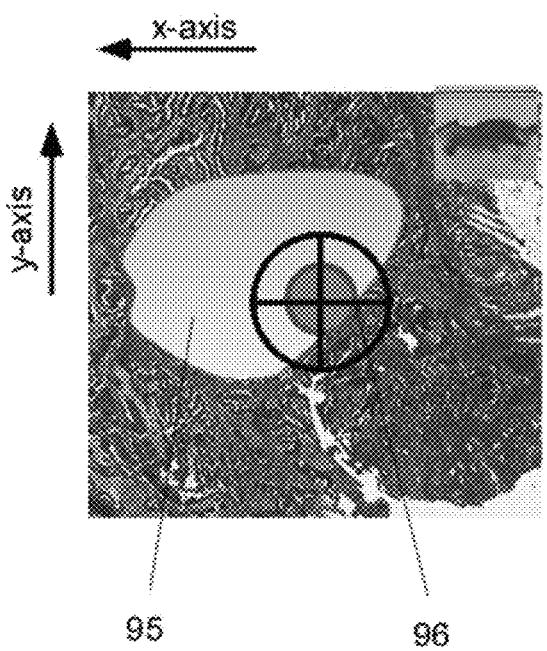
Figure 6D:
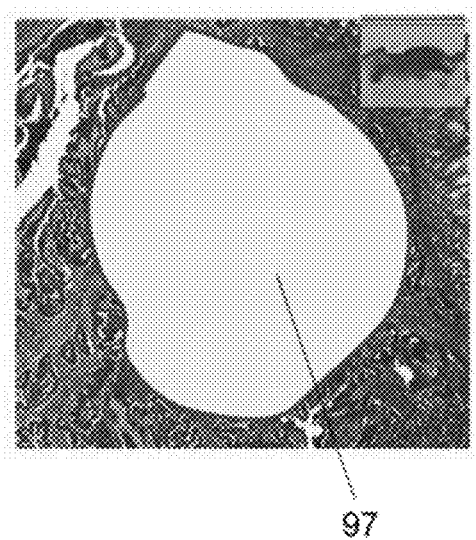

To help guide the user in the microdissection process, the software has been developed to indicate digitally an area of interest, which is superimposed on the live digital image of the tissue section. FIG. 6a shows an example of a tissue section image 91 captured by a digital microscope and displayed on a computer screen. In the upper right corner is an example of a composite image 93 of the tissue section stitched together from a series of individual images generated by the digital microscope. The area currently being viewed live is indicated 92 on the composite image. FIG. 6b shows a digitally indicated area of interest superimposed on the live image. The areas of interest can be of any size and shape, larger or smaller than the field of view, and multiple areas of interest can be created on a particular tissue section. Once properly positioned, the area of interest is "locked" in position relative to the tissue section such that when the tissue section is moved in the X and Y axis directions, the area of interest moves with the live image (FIG. 6c). In this way, the area of interest can guide the user to microdissect the proper region of tissue 95 using the cutting tip 96. Once complete, the area of interest is now devoid of tissue 95, which has been recovered by the cutting tip (FIG. 6D).

Figure 7A:
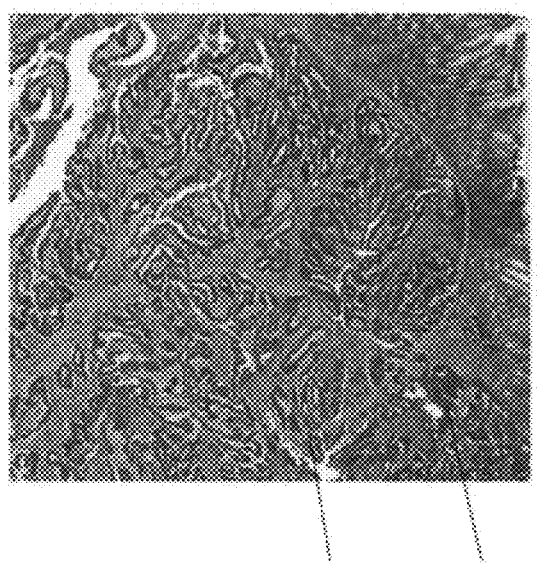
FIG. 7A-B show images of tissue having a defined area of interest in accordance with another embodiment of the present invention.
Figure 7B:
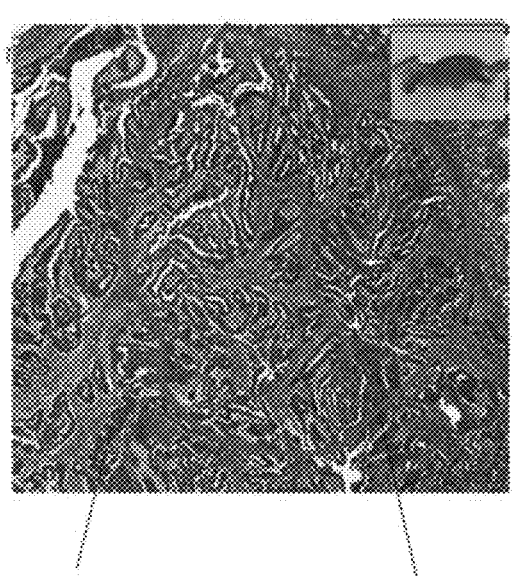

As has been described, in one aspect the software can generate an area of interest from a neighboring tissue section. The advantage of generating the area of interest from a neighboring section is the preparation conditions of the neighboring section can be chosen for optimal viewing. For example, the use of a glued on coverslip, and the use of multiple tissue stains, which provide significantly more biological information, but are inhibitory to the downstream biochemistries typically performed on microdissected tissue. For example, FIG. 7a shows an area of interest 94 positioned on an image from a cover slipped H&E stained tissue section 99. FIG. 7b shows an image of a neighboring tissue section 91 optimized for tissue microdissection (for example stained with a non-inhibitory stain such as Analine Blue and not cover slipped). A copy of the area of interest 94 has been positioned on the corresponding region of tissue, as determined by tissue morphology shared by the neighboring tissue sections.

EXAMPLES

Example 1: Material Extraction Device

Figure 8:
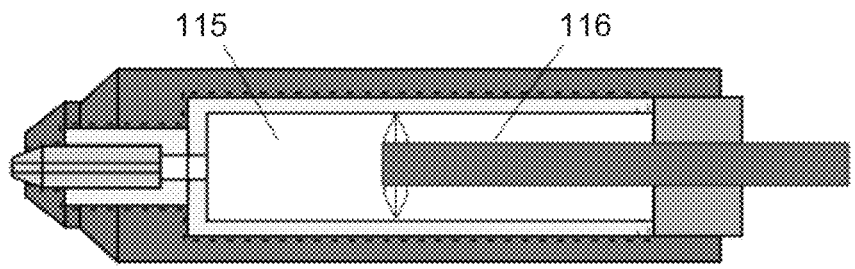
FIG. 8 shows cross sectional views of a material extraction device having various components separated out in accordance with one embodiment of the present invention.
Figure 8:
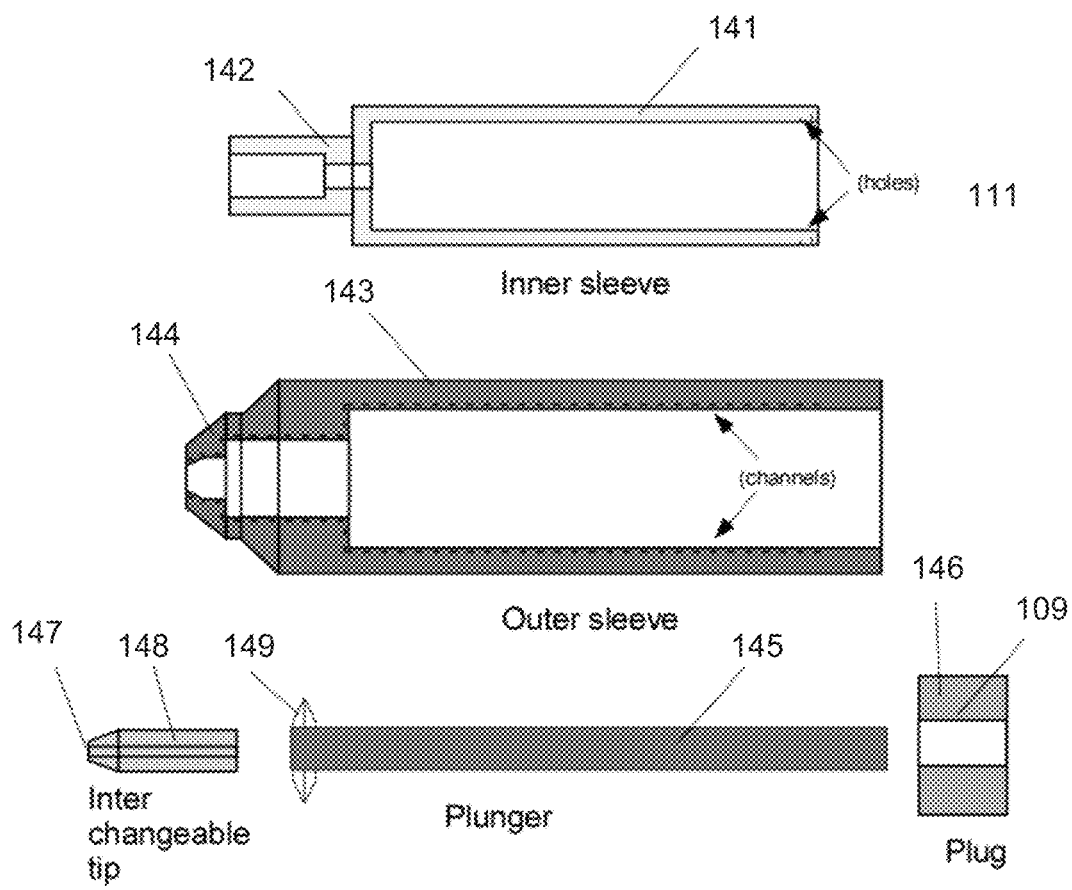
Figure 8:
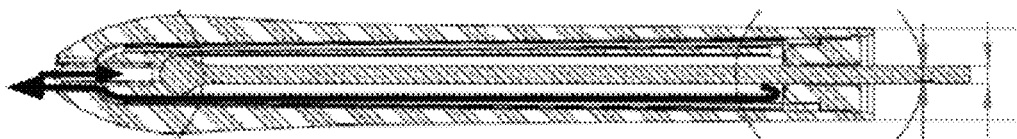

A material extraction device is shown in FIG. 8. Various parts are made using an injection molding or sinter molding process and therefore are made of plastic or fused metal powder. The components are listed below.

Two concentric syringe tubes, and inner tube 141 and an outer tube 143.

A portion of the inner tube 142 is shaped to receive the cutting tip 147.

A portion of the outer tube 144 is shaped to divert the dispensed liquid onto the cutting tip.

A plunger 145 with a compression seal 149 against the inner wall of the inner syringe tube 141, which creates the plunger end chamber 116 and the non-plunger end chamber 115.

An annular seal 146 between the inner and outer chambers located at the plunger end.

A slideable annular seal 109 between the plunger and the inner syringe tube.

The cutting tip 147 that contacts the slide surface and displaces tissue.

The cutting tip tube 148 that provides fluid communication between the slide surface and the non-plunger end chamber 115 in order to aspirate the displaced tissue fragments.

Two holes 111 providing fluid communication between the plunger end chamber and the channels between the inner and outer syringe tubes.

Example 2: Material Extraction System

Figure 9:
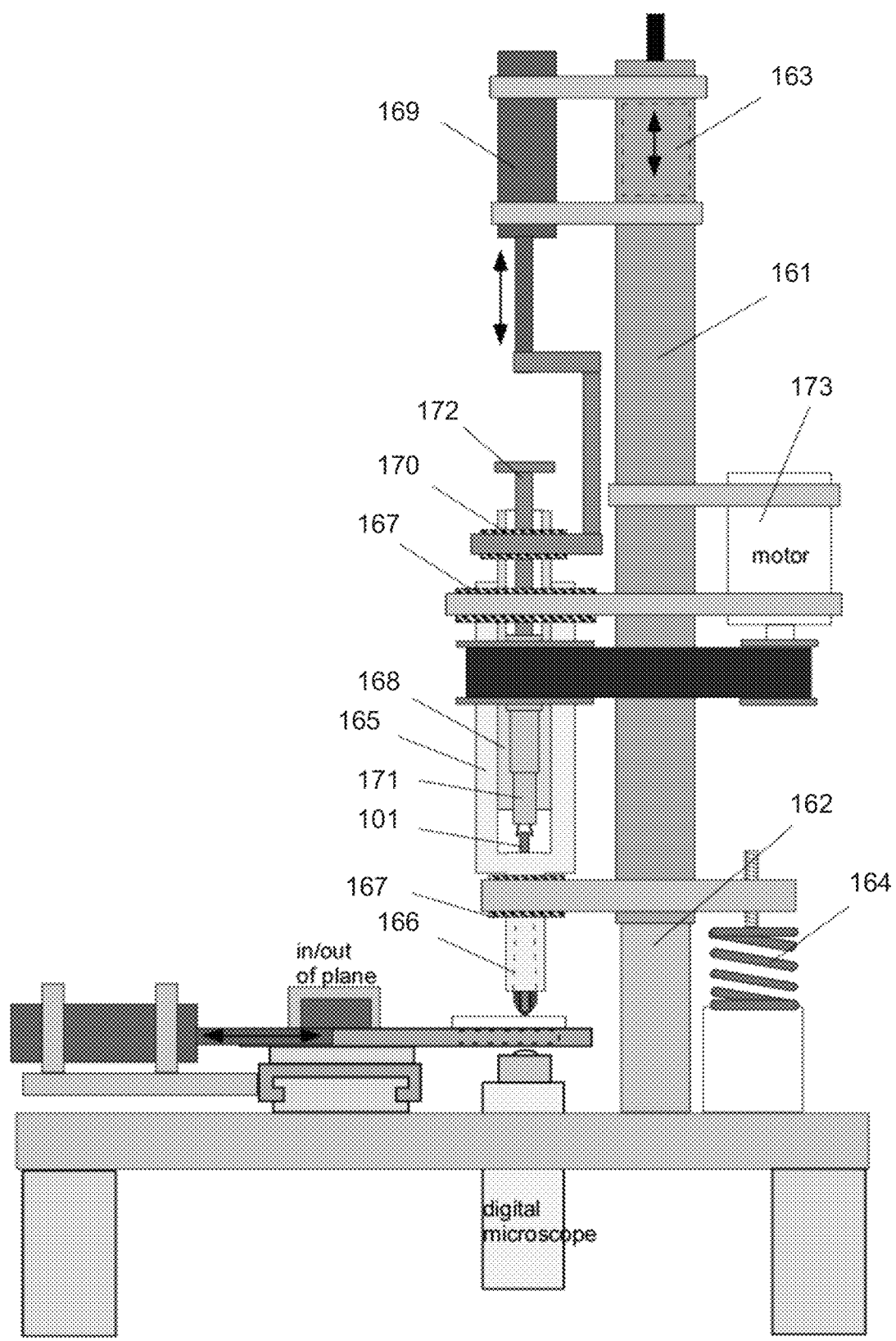
FIG. 9 shows a side view of a material extraction system in accordance with one embodiment of the present invention.

A material extraction system is shown in FIG. 9. The instrument head assembly 161 is mounted on a set of rails 162, which are mounted perpendicularly to the plane of the slide. Z-axis movement of the instrument head on the rails is controlled by a linear actuator 163, which controls contact of the cutting bit with the slide. The pressure of the cutting bit on the slide surface is created by the weight of the instrument head assembly riding on an adjustable spring 164. The instrument head assembly contains a rotational assembly with the axis of rotation oriented vertically and passing through the center of focus of the digital camera. The rotational assembly is comprised of an outer cylinder 165 with a Morris taper 166 on the axis of rotation that matches the taper of the cutting bit. The outer cylinder is supported by bearings 167, which are held mounted in the instrument head assembly. The rotational assembly is also comprised of an inner cylinder 168, which is movable along the axis of rotation by a linear actuator 169. The linear actuator is mounted to the instrument head assembly and is rotationally decoupled from the rotational assembly by a bearing 170. The inner cylinder contains a grasping cassette 171, which allows reversible grasping of the cutting bit plunger 101. Control of the grasping cassette is via a rod 172, depression of which releases the grip of the grasping cassette on the plunger of the cutting bit and ejects the cutting bit from the Morris taper. Rotational force of the rotational assembly is generated by a motor 173, which is mounted on the instrument head assembly.

Of course, it is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. An extraction device for selectively extracting biological material from a biological sample, comprising:
    a cutting tip configured to be rotatably driven about a rotating axis by a motor, the cutting tip being configured to disrupt material from a region of a sample, the cutting tip comprising a liquid aspiration port centrally located within the cutting tip and exposed to the region of the sample;
    a liquid dispensing port located proximal to the cutting tip, the liquid dispensing port being fluidly connected along a first fluidic pathway to a liquid dispensing reservoir and the liquid dispensing port being configured to dispense liquid from the liquid dispensing reservoir to an interface between the sample and the cutting tip,
    wherein the cutting tip comprises a second fluidic pathway that is fluidly connected to the liquid aspiration port, the second fluidic pathway having an axis coaxial with the rotating axis of the cutting tip; and
    a pump fluidly connected with the liquid aspiration port via the second fluidic pathway and being configured to aspirate liquid and disrupted biological material from a region proximal to the cutting tip via the liquid aspiration port.

2. The device of claim 1, wherein the liquid dispensing port and the liquid aspiration port are configured to function simultaneously.

3. The device of claim 1, wherein the cutting tip is sized to disrupt an area of biological material of from about 10 μm in size to about 1 mm in size.

4. The device of claim 1, wherein the cutting tip is sized to disrupt an area of biological material of from about 100 μm in size to about 250 μm in size.

5. The device of claim 1, wherein the pump comprises a plunger.

6. The device of claim 1, wherein the liquid dispensing port is configured to rotate with the cutting tip.

7. A system for selectively extracting biological material from a biological sample, comprising:
    the extraction device of claim 1 positioned to operationally face a support substrate and to engage a biological sample disposed on the support substrate;
    a motor operationally coupled to the extraction device and operable to rotate the cutting tip;
    a fluidics system coupled to the extraction device and operable to deliver fluid to the liquid dispensing port and withdraw fluid from the liquid aspiration port; and
    a positional movement system coupled to the extraction device and operable to move either the cutting tip of the extraction device relative to the support substrate or the support substrate relative to the cutting tip.

8. The system of claim 7, further comprising a visualization system positioned to provide a visual display of the biological sample placed on the support substrate, wherein the visualization system includes a member selected from the group consisting of digital imagers, optical imagers, microscopes, inverted microscopes, and combinations thereof.

9. The system of claim 8, wherein the support substrate is transparent.

10. The system of claim 9, wherein the visualization system is an inverted microscope positioned to provide the visual display from a side of the support substrate opposite the cutting tip.

11. The system of claim 8, wherein the visualization system is configured to provide a real time visual display of the cutting tip during an extraction procedure.

12. The system of claim 7, further comprising a manual manipulation system functionally coupled to the positional movement system and configured to allow a user to move the cutting tip and/or the support substrate relative to one another.

13. The system of claim 7, further comprising an automatic manipulation system functionally coupled to the positional movement system and configured to automatically move the cutting tip and/or the support substrate relative to one another.

14. The system of claim 13, further comprising a processing system functionally coupled to the automatic manipulation system, the processing system configured to:
    identify and locate a predetermined region of biological material to be extracted from a biological sample; and
    move the cutting tip and/or support substrate relative to one another to extract the biological material via the automatic manipulation system.

* * * * *